United States Patent [19]
van der Lely

[11] 3,952,489
[45] Apr. 27, 1976

[54] HAY-MAKING MACHINES
[76] Inventor: Cornelis van der Lely, 7, Bruschenrain, Zug, Switzerland
[22] Filed: June 11, 1974
[21] Appl. No.: 478,227

[30] Foreign Application Priority Data
June 13, 1973 Netherlands.................... 7308237

[52] U.S. Cl. ............................................. 56/370
[51] Int. Cl.² ........................................ A01D 79/00
[58] Field of Search .............. 56/370, 368, 365, 377

[56] References Cited
UNITED STATES PATENTS
| | | | |
|---|---|---|---|
| 3,664,106 | 5/1972 | Maugg | 56/370 |
| 3,735,573 | 5/1973 | Dziuba et al. | 56/370 |
| 3,827,224 | 8/1974 | Mulder | 56/370 |

FOREIGN PATENTS OR APPLICATIONS
| | | | |
|---|---|---|---|
| 448,596 | 4/1968 | Switzerland | 56/370 |
| 1,047,143 | 11/1966 | United Kingdom | 56/370 |

Primary Examiner—Louis G. Mancene
Assistant Examiner—J. N. Eskovitz
Attorney, Agent, or Firm—Mason, Mason & Albright

[57] ABSTRACT

A hay making machine has raking heads that rotate about non horizontal axes. Each head has a central hub with lower groups of tines pivotally connected to the hub around its lower periphery and vertically movable from generally radial crop working positions to an upwardly extending transport position. Upper crop working elements are also pivoted to the hub and independently turnable about horizontal axes. The upper elements can be further groups of tines or tubular crop engagers. In operation, the upper elements together with the lower elements present an inclined surface that engages long stemmed crop. By pivoting the lower groups, different angles of crop engaging surfaces are presented so that swath or tedding working positions are formed. The upper groups can be tines on further arms that pivot on support arms that connect the lower tine elements to the hub. The upper and lower groups are associated with pivots and stops to limit their working and transport positions.

47 Claims, 10 Drawing Figures

HAY-MAKING MACHINES

For a better understanding of the invention, and to show how the same may be carried into effect, reference will now be made, by way of example, to the accompanying drawings, in which.

Figure 1:
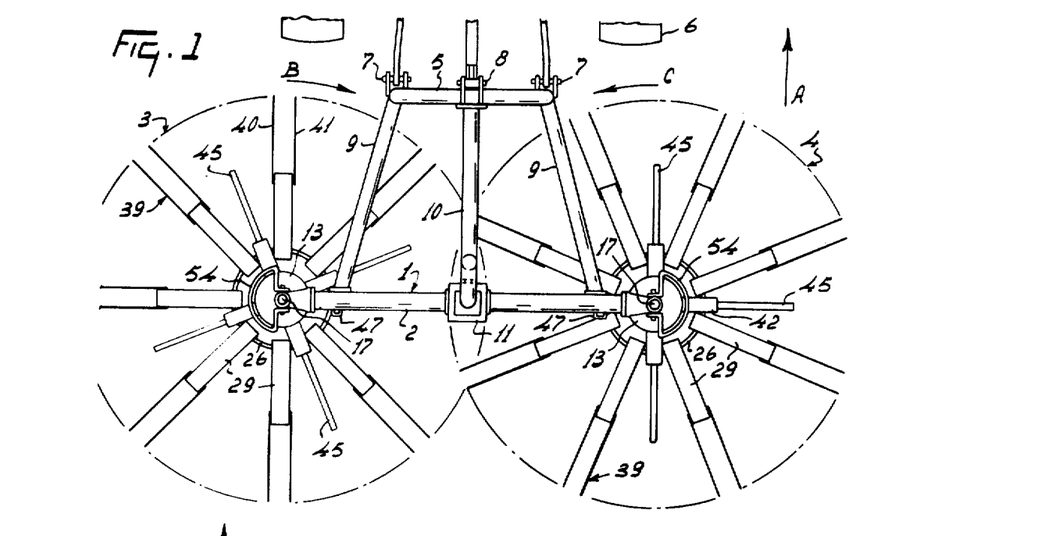
FIG. 1 is a plan view of a hay making machine in accordance with the invention connected to the rear of an agricultural tractor.
Figures 2, 6:
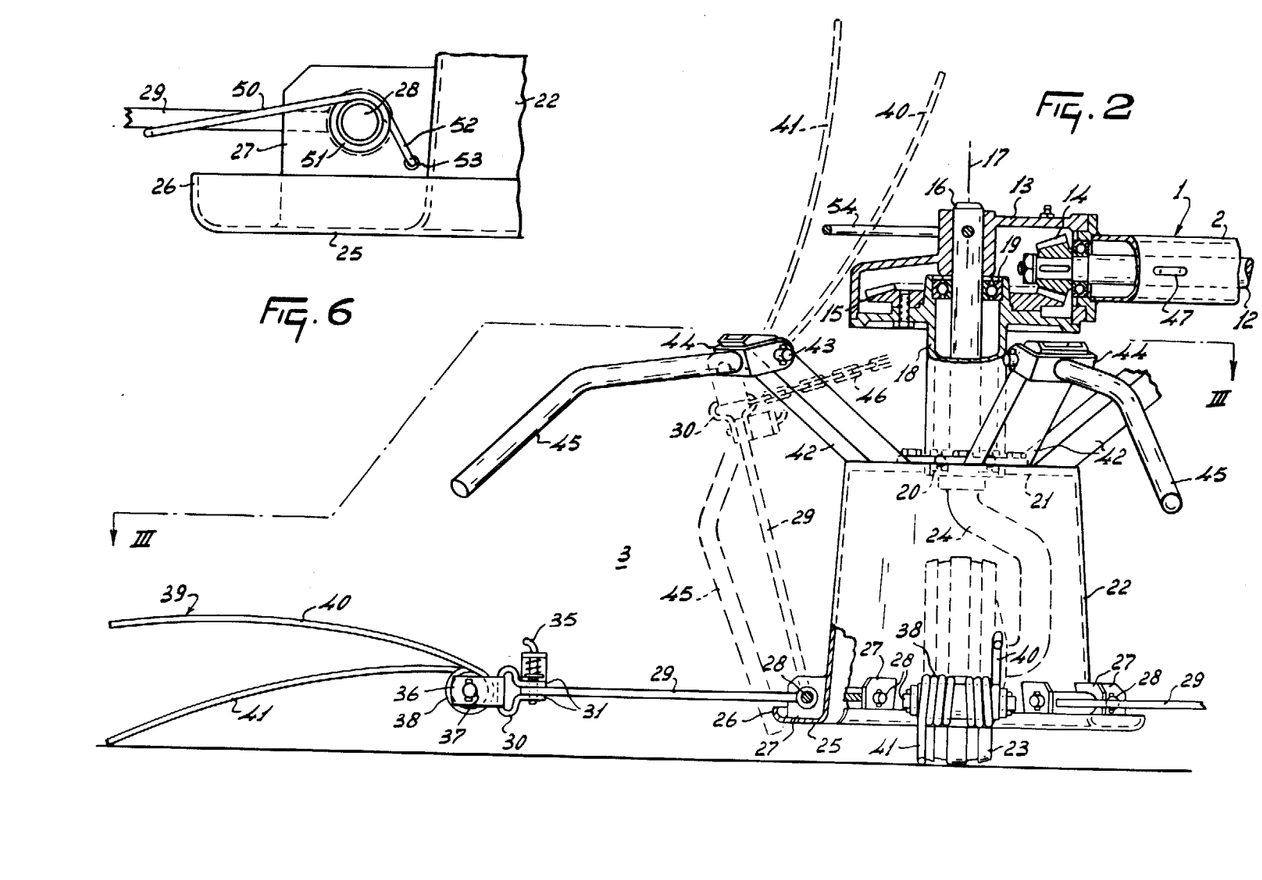
FIG. 2 is a part-sectional rear elevation, to an enlarged scale, of one of the rake members of rake heads of the machine of FIG. 1 as seen in the direction indicated by an arrow II in FIG. 1.
FIG. 6 is an elevation as seen in the same direction as FIGS. 4 and 5, to a further enlarged scale, illustrating the resilient support of a group of tines of one of the rake members or rake heads.
Figure 3:
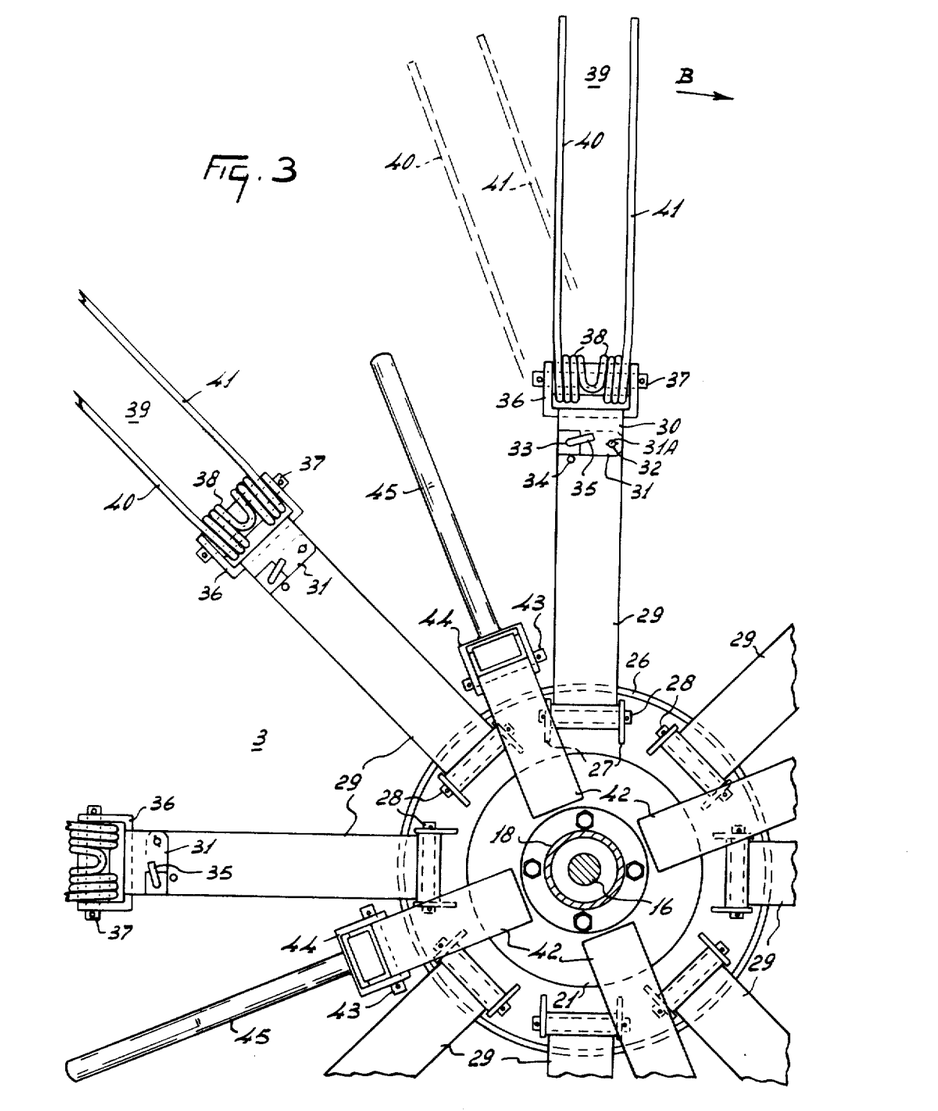
FIG. 3 is a section taken on the line III—III in FIG. 2.
Figures 4, 5:
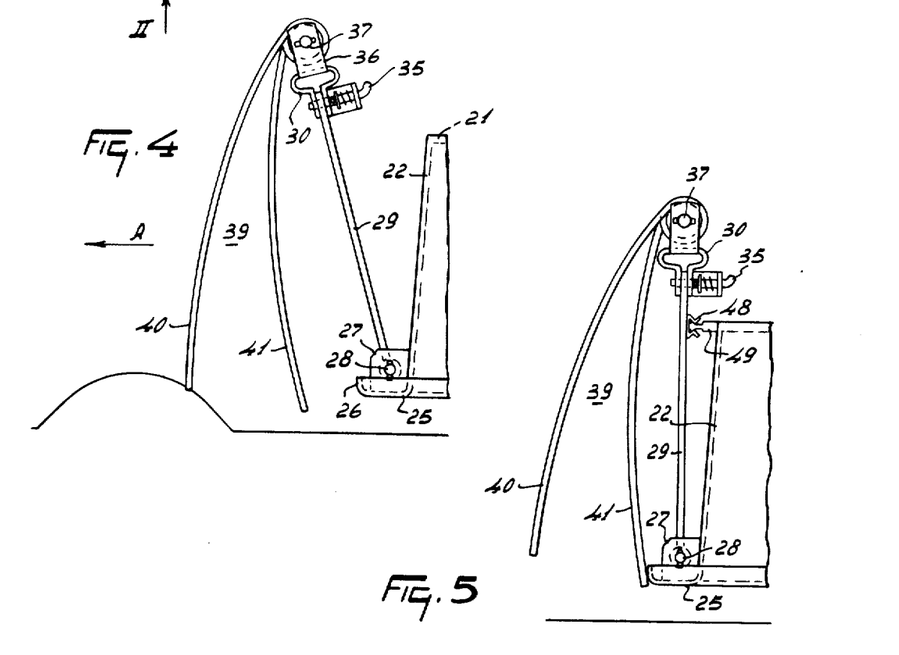
FIG. 4 is a diagrammatic elevation as seen in a horizontal direction perpendicular to the direction indicated by the arrow II in FIG. 1, FIG. 4 being to the same scale as FIGS. 2 and 3 and demonstrating the way in which tines of one of the rake members or rake heads of the machine will match undulations in the ground surface during operation.
FIG. 5 is a similar view to FIG. 4 but illustrates a modified construction of means for retaining tines of one of the rake members or rake heads of the machine in an inoperative position suitable for transport purposes.

Referring to FIGS. 1 to 6 of the drawings, the hay making machine that is illustrated has a frame 1 which includes a main frame beam 2 that extends substantially horizontally transverse, and normally substantially perpendicular, to the intended direction of operative travel of the machine which is indicated by an arrow A in FIGS. 1 and 4 of the drawings. Two rake members or rake heads 3 and 4 are mounted at the opposite ends of the main frame beam 2 so as to be rotatable about corresponding axes that are substantially, but not truly, vertical during the use of the machine. The frame 1 includes a coupling member or trestle 5 that is of basically inverted U-shaped configuration, the coupling member or trestle 5 being constructed and arranged for connection to the three-point lifting device or hitch of an agricultural tractor 6 or other operating vehicle by way of lower fastening means in the form of apertured lugs and pivot pins 7 and upper fastening means in the form of apertured lugs and a pivot pin 8. The upper lifting link of the three-point lifting device or hitch of the tractor 6 or other operating vehicle will normally be adjustable in length in known manner and this adjustability enables the position of the machine to be varied with respect to the tractor 6 or other operating vehicle. Two tubular beams 9 interconnect lower regions of the limbs of the coupling member or trestle 5 adjacent the pivot pins 7 and opposite end regions of the main frame beam 2 close to the axes of rotation of the rake members or rake heads 3 and 4, said beams 9 being forwardly convergent in the direction A as seen in plan view (FIG. 1). A strengthening beam 10 is inclined downwardly and rearwardly with respect to the direction A from the apex of the coupling member or trestle 5, adjacent the pivot pin 8, to the top of a gear box 11 which is mounted centrally along the main frame beam 2. The longitudinal axis of the strengthening beam 10 is contained in a vertical plane of substantial symmetry of the machine that extends parallel to the direction A.

The gear box 11 has a rotary input shaft whose splined or otherwise keyed and projects forwardly therefrom in substantially the direction A beneath the strengthening beam 10 as viewed in FIG. 1 of the drawings. The projecting end of the rotary input shaft of the gear box 11 is intended to be placed in driven connection with the power take-off shaft of the agricultural tractor 6 or other operating vehicle by way of an intermediate telescopic transmission shaft of a construction that is known per se having universal joints at its opposite ends. As can be seen in FIG. 2 of the drawings, the main frame beam 2 is of tubular construction and two axially aligned shafts 12 extend substantially horizontally through that beam from opposite sides of the gear box 11 to gear boxes 13 that are fastened to the opposite ends of the beam 2. The shafts 12 are provided with bevel pinions inside the gear box 11 and the teeth of those bevel pinions are in driven mesh with the teeth of a further bevel pinion carried by the rotary input shaft that has been mentioned above. Ball bearings rotatably support the shafts 12 at opposite sides of the gear box 11 and at the junctions of the beam 2 with the gear boxes 13, one such ball bearing being visible in FIG. 2 of the drawings. The two shafts 12 serve indirectly to drive the rake members or rake heads 3 and 4 during the use of the machine. The end of each shaft 12 that projects into the corresponding gear box 13 is provided with a bevel pinion 14 whose teeth are in driving mesh with those of a bevel pinion or crown wheel 15 that is secured by bolts to an upper flange of a sleeve 18 that is rotatable around a central shaft 16 of the corresponding gear box 13 by means of upper and lower ball bearings 19 and 20. The central shaft 16 that can be seen in FIGS. 2 and 3 of the drawings is, as discussed above, substantially, but not truly, vertically disposed during the use of the machine and its longitudinal axis 17 is coincident with the axis of rotation of the rake member or rake head 3. The construction and arrangement of the rake head 3 will be described in further detail below, and, since the rake member or rake head 4 is substantially identical, apart from its intended direction of rotation, a separate detailed description thereof is not necessary. It will be noted from FIG. 2 of the drawings that the central shaft 16 is rigidly mounted in the corresponding gear box 13, a transverse pin establishing a rigid connection near the uppermost end of said shaft. The sleeve 18 coaxially surrounds the shaft 16 and its lowermost end carries a circular plate 21 that is perpendicular to the axis 17. The circular plate 21 forms the top of a housing 22 having the shape of a gently tapering truncated cone whose central axis is coincident with the axis 17. If the cone of which the housing 22 forms a part were complete, its apex would be located at a point on the axis 17 well above the corresponding gear box 13. The bottom of the housing 22 is open and the interior of the housing accommodates a corresponding ground wheel 23 a lowermost-ground-engaging region of which projects downwardly beneath the bottom of the housing 22. The plane of rotation of the ground wheel 23 contains the axis 17, a substantially horizontal axle about which the ground wheel 23 is rotatable being integrally connected to the overlying shaft 16 by a bent shaft portion 24 whose shape can be seen in broken lines in FIG. 2 of the drawings. The lowermost edge of the housing 22 is bent over to form a substantially horizontal flange 25 that is radially disposed with respect to the axis 17 and whose center of curvature coincides with that axis. The flange 25 has an upwardly bent over outermost rim 26.

Eight pairs of lugs 27 are rigidly mounted on top of the flange 25 and against the outer surface of a lower region of the housing 22 at 45° intervals around the axis 17, the two lugs 27 of each of the eight pairs being spaced apart from one another by the same distances. As can be seen best in FIG. 2 of the drawings, each lug 27 is of substantially square shape, all of them being disposed substantially radially with respect to the axis 17. The lugs 27 are rigidly connected to the housing 22 and its flange 25 by welding two neighboring edges of each lug to those parts. Eight pivotal shafts 28 have their opposite ends entered through substantially horizontally aligned holes formed in the two lugs 27 of each pair so that the pivotal axis defined by each shaft 28 is perpendicular to the axis 17. Sleeves at the radially inner ends of eight tine support arms 29 are arranged around the eight pivot pins 28 in such a way that the eight arms 29 are turnable about the corresponding pivotal axes and extend outwardly with respect to the axis 17 when they occupy operative positions similar to those shown in FIG. 1 of the drawings and in full lines in FIG. 2 thereof. Each tine support arm 29 is formed from a strip of ferrous sheet metal such, for example, as spring steel. The strips which principally afford the arms 29 are so arranged that their broad sides are substantially perpendicular to the axis 17 when they are occupying operative positions similar to those illustrated in FIG. 1 of the drawings and in full lines in FIG. 2 thereof. The relative dimensions of the breadth of each strip and its thickness will be apparent from a comparison between FIGS. 2 and 3 of the drawings. Brackets 30 are arranged at the outermost ends of the tine support arms 29, each bracket 30 being shaped to define an eye and two flanges 31 that lie respectively above and below the broad surfaces of the strip-like arms 29 at the outermost ends thereof. As can be seen in FIG. 3 of the drawings, each bracket 30 has a width in a direction parallel to the corresponding pivot pin 28 that is the same as the width of the arm 29 to which it is connected. Holes 31A (FIG. 3) are formed through the two flanges 31 of each bracket 30 and the arm 29 that is sandwiched between them, said holes 31A receiving a corresponding pivot pin 32. The pivot pins 32 define axes that are perpendicular to the lengths of the arms 29 and which, during operation of the machine, are substantially parallel to the axis 17. A second set of aligned holes 33 is formed through each pair of flanges 31 and the corresponding arm 29 is formed with at least two holes 34 that are spaced apart from each other but that are located at the same distance from the corresponding pivot pin 32 as are the holes 33. The upper surface of each upper flange 31 carries a bracket in which a spring-loaded locking pin 35 is mounted, the locking pin 35 being engagable in either, or any, one of the corresponding holes 34 to maintain the whole bracket 30 in a corresponding angular setting about the pivot pin 32 relative to the arm 29 concerned.

The eye of each bracket 30 is not of circular configuration but comprises a flat part which, as seen in full lines towards the left-hand side of FIG. 2 of the drawings, is the outermost part of the bracket 30 concerned with respect to the axis 17. This outermost flat part of each sheet metal or other sheet material bracket 30 is perpendicular to the general plane of the corresponding arm 29. Each bracket 30 has a corresponding U-shaped tine holder 36 secured to it in such a way that the base of the U is disposed inside the bracket eye against the flat outermost part of that bracket that has just been discussed. The limbs of each holder 36 project outwardly away from the base thereof with respect to the axis 17 and are contained in planes which are perpendicular to the general plane of the corresponding arm 29 and to a plane containing the outermost flat part of the corresponding bracket eye. A substantially horizontal pivot pin 37 perpendicularly interconnects the limbs of each tine holder 36 in such a way as to extend substantially tangentially with respect to a circle centered upon the axis 17, at least when the machine is in operation.

Groups 39 of two tines 40 and 41 are formed integrally from single lengths of spring steel wire or rod or other resilient material and each group includes two helical coils 38 that are wound coaxially around a corresponding one of the pivot pins 37. Each helical coil 38 has a plurality of turns and, as can be seen in FIG. 3 of the drawings, the coils 38 corresponding to the two tines 40 and 41 of each group 39 are integrally interconnected by a U-shaped bend. The tines 40 and 41 extend generally outwardly with respect to the axis 17 when they are in operative positions and are then so disposed, that, measured in a direction perpendicular to the longitudinal axis of the corresponding pivot pin 37 (FIG. 2), the free ends or tips of the two tines 40 and 41 are spaced apart from one another by a distance which it is preferred should not be less than one-third of the total length of one of the two tines. When viewed in a direction parallel to the axis 17 (FIG. 3), a line joining the free ends or tips of the two tines 40 and 41 of each group 39 is substantially parallel to the longitudinal axis of the corresponding pin 37.

As viewed in the direction of FIG. 2 of the drawings both tines 40 and 41 of each group 39 are gently but uniformly curved away from the corresponding coils in such a way, that, during operation, a tangent to the curvature of the tine 40 shown in full lines in FIG. 2 of the drawings at a point close to the corresponding coil 38 is inclined to the ground surface at an angle of substantially 30°. A similar tangent taken at a point close to the outermost free end or tip of the tine 40 is substantially horizontally disposed. On the other hand, a similar tangent to the tine 41 taken at a point close to the corresponding coil 38 is substantially horizontally disposed whereas a tangent to that tine taken at a point close to the outermost free end or tip thereof is inclined downwardly towards the ground in a direction away from the coil 38 concerned. As seen in FIG. 3 of the drawings in a direction parallel to the axis 17, the two tines 40 and 41 of each group 39 are substantially parallel to one another.

The circular plate 21 at the top of the housing 22 carries four booms 42 that are spaced apart from one another around the axis 17 at 90° intervals and that, as seen in FIG. 3 of the drawings, extend radially relative to that axis. However, it can be seen from FIG. 2 of the drawings that each boom 42 is actually inclined upwardly and outwardly away from the top of the housing 22, it being noted that the longitudinal axis of each boom 42 bisects the 45° angle between the longitudinal axes of two neighbouring tine support arms 29 as seen in FIG. 3 of the drawings. The upward and outward inclination of each boom 42 is such that an angle of substantially 45° is enclosed between its longitudinal axis and the axis 17. A substantially horizontal pivot pin 43 is arranged transversely through each boom 42 adjacent the uppermost and outermost end thereof and the limbs of a corresponding fork 44 are turnably arranged about the axis of each pin 43. The axes of the pins 43 are perpendicular to the axis 17 and the web or base of each fork 44 has one end of a corresponding tubular crop engager 45 rigidly secured to it. Each crop engager 45 extends substantially radially of the axis 17 during the operation of the machine as seen in FIG. 3 of the drawings but it will be seen from FIG. 2 thereof that each crop engager 45 actually comprises two straight portions of substantially equal lengths that are integrally interconnected by an angular junction in such a way that an angle of substantially 120° is enclosed between said two portions at that junction. Both straight portions of each crop engager 45 have their longitudinal axes contained in a plane that also contains the axis 17. The outer portion is bent over downwardly relative to the inner portion as seen in FIG. 2 of the drawings. The overall length of each crop engager 45 is such that, as seen in FIG. 3 of the drawings in an operative position of the machine, that length is substantially equal to the length of one of the tine support arms 29. The distance between the longitudinal axis of each pivot pin 43 and the axis 17 is substantially 40 per cent of the length of one of the arms 29 and the height of the pivot pins 43 above the pivot pins 28 is substantially equal to the length of one of the arms 29. It will be noted from FIG. 1 of the drawings that the distance between the axes of rotation 17 of the two rake members or rake heads 3 and 4 is such that the circles traced by the free ends or tips of the tines 40 and 41 overlap each other during the operation of the machine, the drive transmission to the two members or heads 3 and 4 being arranged in such a way that the tines corresponding to each of them "intermesh" in the region of overlap to avoid fouling.

In the use of the hay making machine which has been described, the pivot pins 7 and 8 are employed to connect the coupling member or trestle 5 to the free ends of the upper and lower lifting links of the three-point lifting device or hitch of the tractor 6 or other operating vehicle, and the rotary input shaft of the gear box 11 is placed in driven connection with the power take-off shaft of the same tractor 6 or other operating vehicle by way of the previously mentioned intermediate telescopic transmission shaft having universal joints at its opposite ends. Upon applying rotary drive to the input shaft of the gear box 11, the bevel pinions within that gear box, the shafts 12 and the parts that are contained within the gear boxes 13 cause the sleeves 18 to rotate in the opposite directions that are indicated by arrows B and C in FIGS. 1 and 3 of the drawings. The rake members or rake heads 3 and 4 rotate with the sleeves 18 and their arms 29 and tine groups 39 are caused by centrifugal forces to occupy positions similar to the position that is shown in full lines in FIG. 2 of the drawings for one assembly 29/39. In this position, the longitudinal axis of each arm 29 is substantially perpendicular to the corresponding axis 17 while the center of gravity of the corresponding tine group 39 is located in a position which is such that a straight line of connection between that center of gravity and the axis of the corresponding pivot pin 37 is also substantially perpendicular to the corresponding axis of rotation 17. The coils 38 of each tine group 39 are freely turnable about the axis of the corresponding pivot pin 37. The crop engagers 45 are also moved by centrifugal forces into positions in which they extend outwardly from the pivot pins 43 with respect to the corresponding axes 17. The tines 40 and 41 are long relative to their thickness and are of highly resilient formation. When viewed in a direction parallel to the corresponding axis 17 (FIG. 3), each tine 40 and 41 has a radial length which is not less than substantially 45 per cent of the total radial distance from the axis 17 concerned to the outermost free end or tip of the tine under consideration. The distance which has just been mentioned is also the radius of the circle which is traced by the free ends or tips of the tines 40 and 41 of each rake member or rake head 3 and 4 during the use of the machine, these circles being shown in broken lines in FIG. 1 of the drawings. Each tine 40 and 41 has a length which is not less than 50 times the diameter of the spring steel wire or rod from which it is preferably made. As a result, the tines will particularly readily and smoothly match undulations in the surface of the ground over which the machine travels and accumulations of hay or other crop which may be encountered. This ready matching of the tines to ground and/or crop undulations is enhanced by the pivotal mounting of the support arms 29 about the pins 28 and by the turnability of each group of tines 39 about the corresponding pin 37 relative to the corresponding arm 29.

If a ground undulation or obstacle should be encountered by one of the assemblies of an arm 29 and a tine group 39, as is illustrated diagrammatically in FIG. 4 of the drawings, the support arm 29 will fold upwardly about the corresponding pin 28 towards the central housing 22 while the tine group 39 will fold downwardly about the corresponding pin 37 towards the support arm 29 thus producing a temporary zig-zag folded configuration of the whole assembly with a resultant greatly reduced radial extent of that assembly. Immediately the undulation of obstacle has been passed, the centrifugal force that acts upon the assembly will cause it to return to substantially the configuration thereof that is shown in full lines in FIG. 2 of the drawings. Hay or other crop is effectively displaced by the tine groups 39 and tends to gather against imaginary surfaces that contain the two tines 40 and 41 of each group and that, accordingly, are inclined upwardly and rearwardly away from the ground surface with respect to the directions of rotation B and C. Large accumulations of crop that might otherwise escape over the rear tines 40 (with respect to the directions B and C), particularly near the pivot pins 37, are caught by the crop engagers 45, such accumulations subsequently sliding downwardly along the outer portions of those crop engagers 45 to fall into the reach of tine groups 39 that are following in the directions B and C.

When the rake members or rake heads 3 and 4 are at rest, the tine support arms 29 normally turn downwardly about the pivot pins 28 and bear against the rims 26 of the housing flanges 25. When the machine is to be transported, the three-point lifting device or hitch of the tractor 6 or other operating vehicle to which the machine is connected is raised at which time gravity will cause all of the tine groups 39 to turn downwardly about the pivot pins 37 as far as they can since they are freely pivotable about those pins 37. The machine has a total working width of substantially 4.2 meters and, in order to reduce that width for transport purposes even further than the reduction which is automatically attained upon raising the machine clear of the ground surface, three assemblies of arms 29 and tine groups 39 of one rake member or rake head can be folded upwards while at least two similar assemblies of the other rake member or rake head can be similarly folded upwards. The assemblies to be folded are, of course, those which project laterally outwards to the greatest extent from the path of travel of the tractor 6 as seen in FIG. 1 of the drawings. FIG. 2 of the drawings illustrates the position of one upwardly folded assembly 29/49 in broken lines. A chain 46 or equivalent cable or other flexible but substantially inextensible member is passed through the eyes of the brackets 30 of the upwardly folded assemblies, each of said chains 46 or the like having its opposite ends connected to a corresponding eye 47 (FIGS. 1 and 2 of the drawings) located near the end of the main frame beam 2 concerned. Each chain 46 or equivalent member should have a length which is such that it will pass around the intervening booms 42 in a substantially taut condition. The tine groups 39 of each upwardly folded assembly 29/39 are turned about the corresponding pivot pins 37 to bring them into partially inverted positions in which they bear against the casings of the corresponding gear boxes 13. In order to prevent any jolting during transport from turning the upwardly folded tine groups 39 back about their pivot pins 37 into outwardly directed positions, each gear box 13 carries near its top a corresponding bracket 54 made from rod-shaped material. Each bracket 54 is contained in a plane that is substantially perpendicular to the corresponding axis 17 and comprises a semicircularly curved portion whose center of curvature is substantially coincident with the axis 17 concerned (see FIG. 1 of the drawings). Before the upwardly folded assemblies 29/39 are brought to their final transport positions, one tine 40 of each group 39 is passed upwardly between the corresponding bracket 54 and gear box 13 as shown in broken lines in FIG. 2 of the drawings after which the restraining chain 46 or equivalent member is tightened.

As mentioned above, each tine group 39 of each assembly 29/39 that is not upwardly folded for transport purposes hangs freely downwards under the action of gravity when the machine is lifted clear of the ground for transport. All of the crop engagers 45 also hang freely downwards under the action of gravity about the corresponding pivot pins 43 when the rake members or rake heads 3 and 4 are not rotating and it is possible to reduce the overall width of the machine to substantially 2.7 meters from its working width of substantially 4.2 meters. A downwardly tilted position of one of the crop engagers 45 is shown in broken lines in FIG. 2 of the drawings. It will be remembered that the angle of attack of the tines 40 and 41 can be changed by turning the brackets 30 and the tine groups 39 which they carry about the pivot pins 32. The top of FIG. 3 of the drawings shows one position of one tine group 39 in full lines, the tines 40 and 41 thereof extending substantially radially with respect to the axis 17 as seen in FIG. 3. This working position of the tines is preferably employed when the machine is to function as a tedder to spread hay or other crop more or less at random over the ground behind the machine. A second possible position of one tine group 39 is shown in broken lines at the top of FIG. 3 of the drawings and it will be noted that the tines 40 and 41 are inclined rearwardly so as to trail with respect to the direction B in that position. Such positions of all of the tines 40 and 41 are preferred when the machine is to form the hay or other crop which it displaces into a more or less compact swath or windrow to the rear of the machine. If more than two of the holes 34 are provided in each arm 29, then a corresponding number of angular settings of the tines 40 and 41 with respect to their support arms 29 are possible.

FIG. 5 of the drawings illustrates an alternative way in which appropriate assemblies 29/39 can be retained in upwardly folded positions for inoperative transport purposes. In the construction illustrated in FIG. 5 of the drawings, each support arm 29 carries a spring clip 48 near the corresponding locking pin 35 and one the surface of the arm 29 which is normally uppermost. The clips 48 corresponding to assemblies 29/39 which should be folded up to reduce the widty of the machine for transport purposes co-operate with anchorages 49 that are fastened to the peripheries of the circular top plates 21 of the housings 22 and, when the clips 48 are manually engaged with the anchorages 49, the corresponding tine groups 39 hang downwardly under the action of gravity from the pivot pins 37 in the manner which is illustrated in FIG. 5 of the drawings in respect of one of them, it being noted that the tines 40 and 41 are then located radially outwardly of the corresponding support arms 29 with respect to the axis 17.

FIG. 6 of the drawings illustrates a further alternative construction in which the tine support arms 29 are resiliently mounted. A spring 50 includes a plurality of helical turns 51 that are wound around the corresponding pivotal shaft 28, one end 52 of the spring being anchored in a hole 53 in one of the corresponding pair of lugs 27 while the opposite end thereof is bent over to engage beneath the support arm 29 concerned at a distance outwardly from the pivotal shaft 28. The support arms 29 bear downwardly against the outer parts of the springs 50 in such a way that, during operation of the machine and during transport thereof in the cases of the assemblies 29/39 that are not folded upwardly, neither the arms 29 themselves nor the springs 50 can move downwardly to strike the rims 26 as the result of jolting forward progress of the machine The brackets 30 at the outer ends of the support arms 29 are similarly prevented by the springs 50 from striking the ground surface violently.

Figure 7:
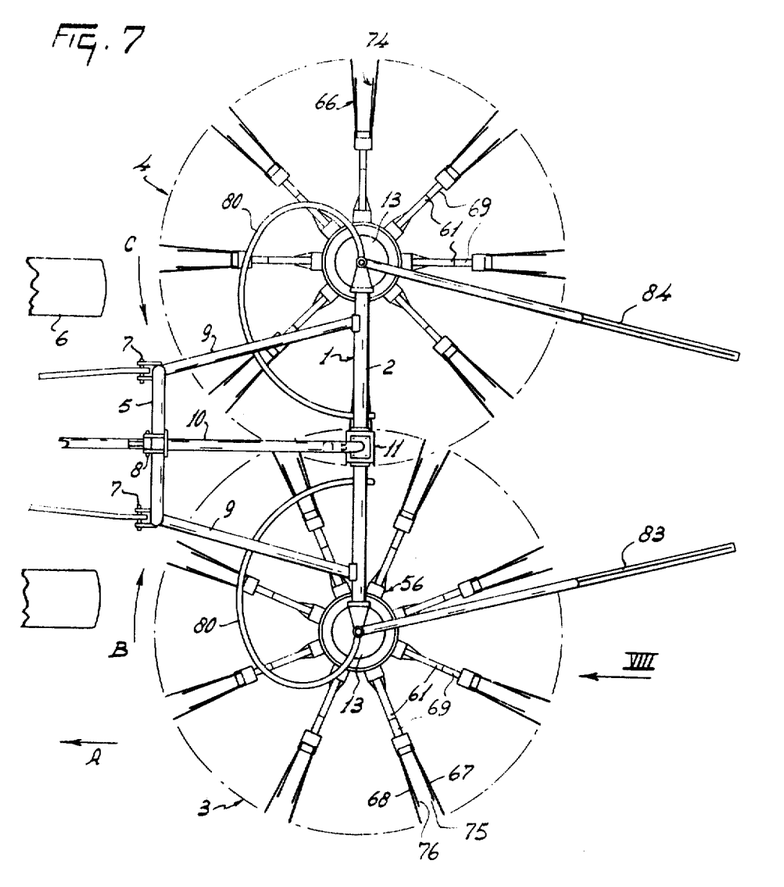
FIG. 7 is a plan view illustrating an alternative form of hay making machine in accordance with the invention connected to the rear of an agricultural tractor.
Figure 8:
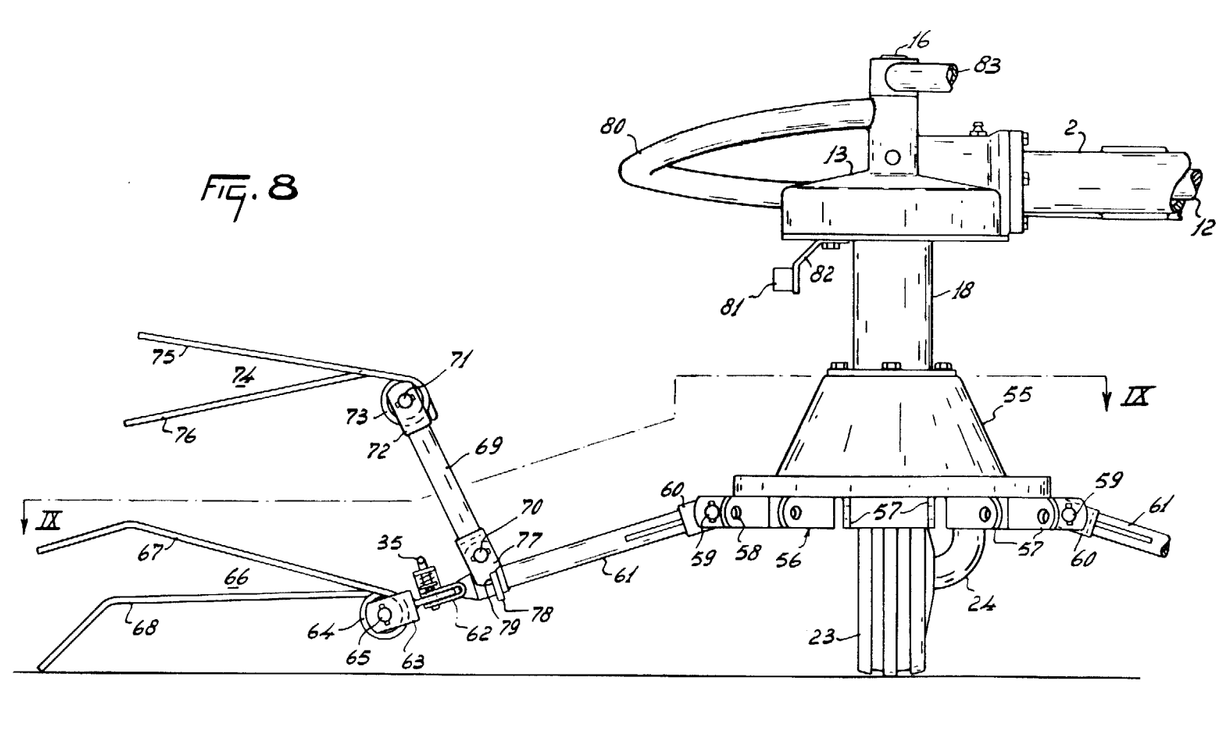
FIG. 8 is a rear elevation, to an enlarged scale, as seen in the direction indicated by an arrow VIII in FIG. 7.
Figures 9, 10:
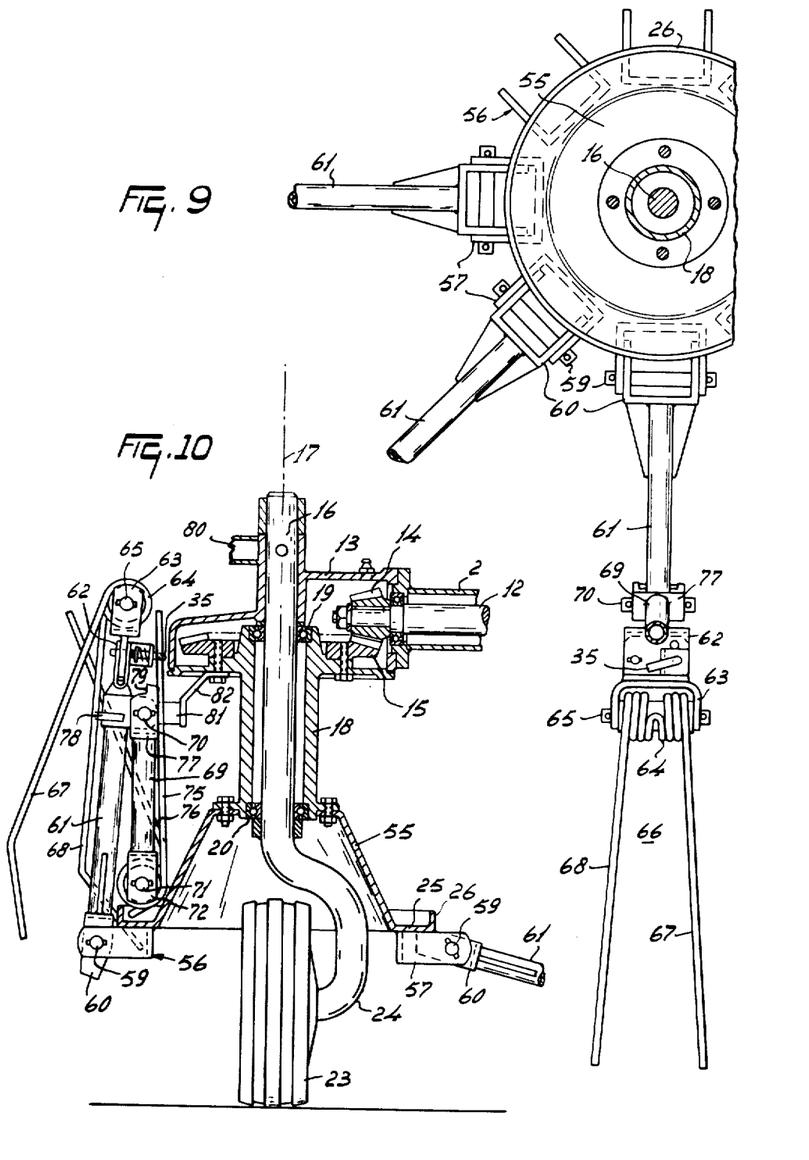
FIG. 9 is a section taken on the line IX—IX in FIG. 8.
FIG. 10 is a part-sectional view substantially corresponding to FIG. 8 but showing tines of one of the rake members or rake heads of the machine in a position suitable for the inoperative transport thereof.

FIGS. 7 to 10 of the drawings illustrate an alternative form of hay making machine in accordance with the invention but it is noted that a number of the parts of the machine of FIGS. 7 to 10 are similar or identical in construction and function to parts that have already been described with reference to FIGS. 1 to 6 of the drawings. Such parts are, accordingly, indicated by the same references as have been employed in FIGS. 1 to 6 of the drawings and will not be described again in detail. In the embodiment of FIGS. 7 to 10 of the drawings, the lowermost end of each sleeve 18 has the top of a housing 55 bolted to it, said housing 55 being similar to the previously described housing 22 except that it is of a more pronounced conical configuration having a cone angle at its imaginary apex of substantially 30°. Eight U-shaped or channel-shaped brackets 56 are secured to the lower surface of the flange 25 at the foot of the housing 55 in such a way that their limbs 57 project outwardly beyond the rim 26, the brackets 56 being angularly spaced apart from one another at 45° intervals around the axis 17. The eight brackets 56 are, in fact, arranged in such a way that a plane containing the longitudinal axes of all of their limbs 57 and all of their bases is perpendicular to the axis 17. The two limbs 57 of each bracket 56 are parallel to one another and more than 50 per cent of the length of each limb projects outwardly beyond the flange rim 26 as viewed in directions parallel to the axis 17 (FIG. 9). As can be seen in FIG. 9 of the drawings, the bases of the eight brackets 56 extend tangentially with respect to a circle centered upon the axis 17. The two limbs 57 of ech bracket 56 are formed with substantially horizontally aligned holes 58 (FIG. 8) through which holes corresponding pivotal shafts 59 are entered, said shafts 59 being turnable in the holes 58. Each shaft 59 has the limbs of a corresponding fork 60 mounted on it between the corresponding limbs 57. The base of each fork 60 has one end of a corresponding support arm or boom 61 rigidly secured to it with the aid of strengthening plates, said arms or booms 61 being disposed so as to extend outwardly from the corresponding pivot pins 59 when the machine is in an operative position. Each support arm or boom 61 has a length which is substantially 1,5 times the distance between the corresponding pivotal shaft 59 and the axis 17.

The end of each support arm or boom 61 that is remote from the corresponding pivotal shaft 59 carries a narrow fork 62 (FIGS. 8 to 10) whose limbs project away from the arm or boom 61 in the same direction as the longitudinal axis of the latter. A tine holder 63 is movable into, and can be retained in, any chosen one of two or more different angular settings relative to the arm or boom 61, the tine holder 63 having a part which is adjustable between the limbs of the fork 62 in a manner which is not necessary to describe in detail, since, as will be evident from FIGS. 8 and 9 of the drawings, it is similar to the arrangement that has already been described above with the particular reference to FIGS. 2 and 3 of the drawings. However, it will be noted that, in the embodiment described with reference to FIGS. 2 and 3 of the drawings, each pivot pin 32 is substantially parallel to the corresponding axis 17 during the operation of the machine, whereas, in the present case, the equivalent pivot pins are appreciably inclined to the vertical in such a way that their longitudinal axis, which intersect the corresponding axes 17 at points below the ground surface during the use of the machine are upwardly divergent away from those points of intersection with the corresponding axes 17. Pivot pins 65 are supported by the limbs of the tine holders 63, said pivot pins 65 defining axes that are perpendicular to the corresponding axes of rotation 17. Each tine holder 63 carries a corresponding tine group 66 comprising two tines 67 and 68 that are formed integrally from a single length of spring steel wire or rod or other resilient material, the group 66 including helical coils 64 that are integral with the two tines 67 and 68 and that are wound coaxially around the corresponding pivot pin 65 between the limbs of the holder 63. As can be seen in FIG. 9 of the drawings, the two coils 64 of each tine group 66 make an integral substantially U-shaped junction midway between the two tines 67 and 68. Each of the tines 67 and 68 has a length which is substantially equal to the distance between the corresponding pivot pin 65 and pivotal shaft 59 and which is also substantially equal to the distance between two parallel, and diametrically opposed, pivotal shafts 59. As in the preceding embodiment, the tines 67 and 68 are very flexible and resilient and each tine has a length which is not less than 50 times the diameter of the spring steel wire or rod from which it is preferably formed. However, in contrast to the preceding embodiment, the tines 67 and 68 are not of gently curved configuration, the two tines 67 and 68 each comprising a longer straight inner portion and a shorter straight outer portion with an integral angular junction between them. The two portions of each tine 67 enclose an angle of substantially 135° between them at their angular junction whereas the two portions of each tine 68 enclose an angle of substantially 120° between them at the corresponding point. The shorter outer portions of the tines have lengths which are substantially one-third of the lengths of the longer inner portions thereof. When viewed in directions substantially parallel to the axes 17, the two tines 67 and 68 of each group 66 diverge outwardly away from the axis 17 concerned and it will be noted that, as in the preceding embodiment, the tine 68 of each group whose outermost free end or tip is closest to the ground surface is in front of the other and higher tine 67 of the same group with respect to the direction of rotation B or C concerned.

Near the outermost end of each support arm or boom 61 which carries the corresponding narrow fork 62, one end of a corresponding tine support 69 is connected to that arm or boom 61 so as to be turnable relative thereto about the axis of a substantially horizontal pivot pin 70. Further constructional details of the pivotal connection will be given below. The pivot pin 70, which is parallel to the corresponding pivot pin 65, is located above the support arm or boom 61 in an operative position of the latter (see FIG. 8 of the drawings). Under these conditions, the tine support 69 extends upwardly away from the pivot pin 70 and outwardly therefrom with respect to the corresponding axis 17. The support 69 has a length which is substantially two-thirds of that of the support arm or boom 61 to which it is connected, an angle of substantially 75° being enclosed between the longitudinal axis of the tine support 69 and an outward extension of the longitudinal axis of the arm or boom 61 in the relative positions thereof that are shown in FIG. 8.

The end of each tine support 69 that is remote from the corresponding pivot pin 70 carries a fork 72 between the limbs of which a pivot pin 71 is lodged in parallel relationship with the corresponding pivot pin 70 and pivotal shaft 59. A tine group 74 comprising two tines 75 and 76 includes helical coils 73 that are wound coaxially and freely turnably around the pivot pin 71 in a similar manner to that which has already been described with reference to the coils 38 and 64. Each tine group 74 is formed integrally from a single length of spring steel wire or rod or other resilient material. The two tines 75 and 76 of each group are both straight and each of them has a length which is substantially 75 per cent of the length of one of the tines 67 or 68. As viewed in a direction parallel to the corresponding axis 17, the outermost free ends of the two tines 75 and 76 of each group 74 are located close to, or radially outwardly of, the angular junctions between the inner and outer straight portions of the tines 67 and 68. It will be seen from FIG. 8 of the drawings that, as viewed in a direction parallel to the corresponding pivot pin 71, the two tines 75 and 76 of each group are inclined to one another by an angle of between substantially 25° and substantially 30° and it will be noted that the lower tine 76 of each group 74 is located forwardly with respect to the corresponding direction B or C of the higher tine 75 of the same group 74.

Each tine support 69 is provided with a fork 77 that is turnable about the corresponding pivot pin 70 with respect to lugs mounted on the corresponding support arm or boom 71. A stop 78 is carried by each arm or boom 61 close to the lugs which have just been mentioned and the limbs of the co-operating forks 77 are formed with angular recesses 79 which are so positioned that they contact the stop 78 in the operative position illustrated in FIG. 8 of the drawings. Each stop 78 and the corresponding recesses 79 co-operate in such a way that the corresponding tine support 69 cannot turn outwardly (i.e. in an anticlockwise direction as seen in FIG. 8 of the drawings) about the corresponding pivot pin 70 beyond the position illustrated in FIG. 8 of the drawings but is free to turn inwardly in the opposite direction.

The top of each gear box 13 has one end of a corresponding substantially helical guide 80 secured to it at the side thereof which is remote from the main frame beam 2. However, a line extending tangentially relative to each curved guide 80 in the region of the junction thereof with the corresponding gear box 13 is substantially parallel to the longitudinal axis of the main frame beam 2. Successively inclined lines of connection between each axis 17 and points along the corresponding guide 80 are of progressively increasing length as the angles between those lines and the longitudinal axis of the main frame beam 2 (as seen in FIG. 1 of the drawings) progressively decrease in magnitude to zero. The two guides 80 are located substantially wholly in front of the main frame beam 2 with respect to the direction A, the ends of the two guides 80 that are remote from the two gear boxes 13 being secured to the bottom of the main frame beam 2 at locations close to the opposite sides of the gear box 11.

In the use of the hay making machine that has been described with reference to FIG. 7 to 10 of the drawings, the housings 55 are driven in the opposite directions B and C in the same manner as has already been described for the housings 22. The support arms or booms 61 and the parts which they carry are rapidly brought by centrifugal forces to operative positions substantially corresponding to the position that is shown for one of them in FIG. 8 of the drawings in which position, it will be noted, the support arms or booms 61 are inclined downwardly to some extent, as well as outwardly, from the pivotal shafts 59 due to the positions of the centers of gravity of the assemblies which are upwardly and downwardly turnable about the shafts 59. The tine groups 66 and 74 extend outwardly from the corresponding pivot pins 65 and 71 but the tine supports 69 do not turn outwardly about their pivots 70 beyond positions similar to the position illustrated in FIG. 8 of the drawings in respect of one of them because of the co-operation of the recesses 79 with the stops 78. In an operative position of each tine group 74, the tines 75 and 76 thereof are so disposed about the corresponding pivot pin 71 that they extend outwardly in substantially, but not truly, perpendicular relationship with the corresponding axes 17. The rake members or rake heads 3 and 4 will match undulations in the ground surface and/or obstacles in their paths very effectively because the tine groups 66 can turn freely upwardly and downwardly about the pivot pins 65 relative to the support arms or booms 61 while the latter are also freely turnable, upwardly and downwardly, about the pivotal shafts 59 with the tine groups 66 and 74 which they carry. The support arms or booms 61, the tine groups 66 and the tine groups 74 are normally disposed in positions similar to the position illustrated at the left-hand side of FIG. 8 of the drawings for one such assembly during operation of the machine and hay or other crop which is encountered is displaced first by the lowermost leading tine 68 so that it moves upwardly over that tine towards the higher and following tine 67. The two tines 67 and 68 of each group 66 effectively constitute an inclined shovel-like surface because the nature of hay and other similar crops is such that even quite small accumulations thereof will not fall readily through gaps of moderate width in contradistinction to granular materials, stones and the like which would find no effective support in an inclined surface skeletally defined in such a manner. Each of the rake members or rake heads 3 and 4 has a diameter of substantially 2 meters and, with a conventional speed of rotation thereof, the circumferential speed of the tines is high. As a result, hay or other crop engaged by the tines 67 and 68 may move upwardly so far that it passes over the upper tines 67. Any such crop is engaged by the tines 75 and 76 of the tine group 74 which is next rearmost with respect to the direction B or C concerned so that the crop in question will not fall straight back to the ground. When very heavy accumulations of hay or other crop are met with, and particularly with high circumferential speeds of the tines, some crop may fly upwardly straight over the tine groups 66 when jolting occurs during operation but all, or most, of such crop that passes over the tine groups 66 is subsequently engaged by the tine groups 74. The rake members or rake heads of a machine in accordance with the invention may have diameters of considerably less than 2 meters but, under these circumstances, their speeds of rotation should be greater than is conventional for known machines of the same general kind: The same operating conditions will them prevail as have just been described for machines having larger diameter rake members or rake heads.

When the tine groups 66 and/or the support arms or booms 61 encounter pronounced undulations or ground obstacles, those parts, together with the supports 69 and tine groups 74, will be displaced upwardly but such displacement is only very temporary because the centrifugal forces that prevail during operation rapidly return any displaced assembly to substantially the position illustrated at the left-hand side of FIG. 8 of the drawings. However, it should be noted that an upward displacement might be sufficiently violent to cause parts of the displaced assembly to strike the main frame beam 2 or 1 of the connecting beams 9 and it is for this reason that the guides 80 are provided beneath the beams 9 and the main frame beam 2. The guides 80 guard against parts of any displaced rake member tine assembly reaching the beams 2 or 9 and direct any such displaced assembly back towards the ground surface.

It will be seen from FIG. 7 of the drawings that, as in the case of the preceding embodiment, the overall width of the machine can be greatly reduced for inoperative transport purposes by folding up three laterally projecting arms or booms 61, the corresponding supports 69 and corresponding tine groups 66 and 74 of one of the rake members or rake heads and two laterally projecting similar assemblies of parts of the other rake member or rake head. As seen in FIG. 7 of the drawings, two assemblies of the rake member or rake head 3 and three assemblies of the rake member or rake head 4 should be folded upwardly for inoperative transport purposes but rotation of both of them through substantially 22½° around the corresponding axes 17 would interchange the numbers of assemblies that need to be folded. FIG. 10 of the drawings illustrates the upwardly folded configuration of one assembly of the kind which has just been mentioned in which configuration the support arm or boom 61 has been turned upwardly about the corresponding pivotal shaft 59 to lie substantially parallel to the corresponding axis 17. The corresponding tine group 66 has turned downwardly about the pivot pin 65 under gravity so that the tines 67 and 68 thereof face that side of the arm or boom 61 which is normally lowermost during operation of the machine. The corresponding tine support 69 has been turned about its pivot pin 70 in a clockwise direction as seen in FIGS. 8 and 10 of the drawings to bring it to a position in which it is substantially parallel to the corresponding axis 17 and corresponding support arm or boom 61, the tine support 69 lying radially inwardly of the arm or boom 61 adjacent that side thereof which is normally uppermost during operation of the machine. The tines 75 and 76 of the corresponding group 74 have been turned in an anticlockwise direction about their pivot pin 71 into a position in which at least the tine 75 is substantially parallel to the coresponding axis 17, the arm or boom 61 and the support 69. The upwardly folded configuration that is illustrated in FIG. 10 of the drawings is maintained by the engagement of the fork 77 with a permanent magnet 81 that is connected by an angular bracket 82 to the upper flange of the corresponding sleeve 18. In practice, one sleeve 18 is provided with three magnets 81 and the other is provided with two magnets 81 and the rake members 3 and 4 are always arranged for transport purposes so that the same one has to have three tine assemblies folded up while the other has to have two tine assemblies folded up. In this connection, it is noted that the discussion of the angular positions of the rake members 3 and 4 that has been made above with respect to FIG. 7 of the drawings is for explanation purposes only. It is not necessary for the rake members 3 and 4 to be interchangeable as regards the number of tine assemblies thereof that should be folded up for transport purposes.

The tine groups 66 can be retained in any chosen one of at least two different angular settings about the pivotal connections of their holders 63 with the corresponding forks 62 in the same manner as has already been described with reference to the first embodiment. When the machine is to spread crop over the ground surface in the manner of a tedder, it is desirable that the tines 67 and 68 of each group 66 should be disposed as shown at the bottom of FIG. 9 of the drawings in which position, as viewed lengthwise of the corresponding axis 17 (FIG. 9), each tine extends substantially radially with respect to said axis 17. When, on the other hand, the machine is to form the displaced hay or other crop into a more or less compact swath or windrow, the tines 67 and 68 should occupy rearwardly inclined trailing positions with respect to the directions of rotation B and C. When compact swaths or windrows are to be formed, two swath boards 83 and 84 (FIG. 7) or like crop guide members are arranged in more or less convergent relationship, rearwardly with respect to the direction A, behind the rake members 3 and 4. Each of the swatch boards 83 and 84 is arranged, in a manner that is known per se, to be angularly adjustable about the corresponding axis of rotation 17, means (not shown in the drawings) being provided to retain the swath boards in the chosen angular settings about said axes of rotation 17. Swaths or windrows of more or less compact configuration can then be formed by increasing or decreasing the degree of rearward convergency of the swath boards 83 and 84.

The adjustability of the angle of attack of the tine groups 39 and 66 which has been described by employing the locking pins 35 and co-operating parts is not provided in respect of the upper tine groups 74 of the embodiment of FIGS. 7 to 10 of the drawings. However, in order to ensure that any crop engaged at the tines of the groups 74 is released therefrom at the correct angular positions around the axes 17 during operation of the machine, the construction illustrated in FIGS. 8 and 9 of the drawings may be modified in such a way that the forks 77, the stops 78 and the tine supports 69 are angularly adjustable with the tine holders 63 about the axes of the pivotal connections between those holders and the support arms or booms 61 (i.e. axes corresponding to those afforded by the pivot pins 32 illustrated in FIG. 3 of the drawings). With such an arrangement, any adjustment of the angle of attack of the tines 67 and 68 will automatically change the angle of attack of the tines 75 and 76 to the same extent.

When the machine of FIGS. 7 to 10 of the drawings is arranged in its inoperative transport position, the tine assemblies of the two rake members or rake heads 3 and 4 thereof that are not folded up are disposed with their support arms or booms 61 extending outwardly and downwardly to some extent from the pivotal shafts 59 because those parts of the limbs of the forks 60 that are disposed radially inwardly of the shafts 59 bear upwardly against the lowermost surface of the corresponding housing flange 25 (see particularly the right-hand side of FIG. 10 of the drawings). A stop is thus afforded which prevents the support arms or booms 61 from turning any further downwardly about the shafts 59 during either transport or operation. When the hay making machine is lifted clear of the ground by the three-point lifting device or hitch of the agricultural tractor 6 or other operating vehicle, the tine groups 66 of the non-folded assemblies under consideration will hang down substantially vertically from the pivot pins 65 as will also the tines of the groups 74. The tine supports 69 will, however, remain in positions similar to the position illustrated at the left-hand side of FIG. 8 of the drawings because of the co-operation of the recesses 79 with the stops 78.

Although various features of the hay making machines that have been described and/or that are illustrated in the accompanying drawings will be set forth in the following claims as inventive features, it is emphasised that the invention is not necessarily limited to those features and that it includes within its scope each of the parts of each hay making machine that has been described and/or illustrated in the accompanying drawings both individually and in various combinations.

What we claim is:

1. A hay making machine comprising a frame and at least one rake head rotatably mounted on said frame, said rake head comprising a first group of crop working elements and a second group of crop working elements, each of said groups having corresponding arms which are different for each group and fastening portions that pivotably connect same to a central hub-like portion, said groups each being pivotable and vertically movable relative to said hub-like portion independent of the other group and driving means connected to said head to rotate same about a non-horizontal axis, said first group of elements including raking elements which are pivotable about an axis that is substantially perpendicular to the axis of rotation of said head.

2. A hay making machine as claimed in claim 1, wherein said raking elements are tines mounted on an arm and said tines are pivotable into a position in which they are substantially parallel to said axis of rotation and to each other.

3. A hay making machine as claimed in claim 2, wherein there are a plurality of arms pivoted to said central portion and at least one arm is retainable in a nonoperative transport position in which the arm extends substantially parallel to said axis of rotation.

4. A hay making machine as claimed in claim 3, wherein said one arm is fastened in said inoperative transport position by chain means.

5. A hay making machine as claimed in claim 3, wherein said one arm is retainable in its inoperative transport position by fastening means on said arm and said hub portion.

6. A hay making machine as claimed in claim 3, wherein said tines can be fastened in an upwardly folded inoperative transport position.

7. A hay making machine as claimed in claim 6, wherein a bracket adjacent said central portion and occupying a fixed position with respect to said frame is located to hold said tines in an upwardly folded inoperative transport position.

8. A hay making machine as claimed in claim 3, wherein, when in an inoperative transportation position, at least one tine extends alongside said one arm.

9. A hay making machine as claimed in claim 8, wherein said second group is comprised of elements on a further arm that is pivoted to said first mentioned arm, whereby, when in an inoperative transport position, said further arm is positioned substantially vertically alongside said first mentioned arm.

10. A hay making machine as claimed in claim 3, wherein a support member, associated with said second group of crop working elements extends parallel to said arm in an inoperative transport position thereof.

11. A hay making machine as claimed in claim 10, wherein at least some of the crop working elements of said first group hang freely downwards in an inoperative transport position of the machine.

12. A hay making machine as claimed in claim 3, wherein said arm is resiliently connected by spring means to said central hub-like portion.

13. A hay making machine as claimed in claim 3, wherein a stop is provided on said portion to limit downward movement of said arm.

14. A hay making machine as claimed in claim 3, wherein limit means on said portion is located to limit upward movement of said crop working elements.

15. A hay making machine as claimed in claim 14, wherein said limit means comprises a guide.

16. A hay making machine as claimed in claim 15, wherein said guide is fastened to said frame and has a helical configuration.

17. A hay making machine as claimed in claim 1, wherein at least one wheel connected to said frame supports said machine on the ground and said wheel is located partially inside said central hub-like portion.

18. A hay making machine as claimed in claim 1, wherein there are two rake heads connected to said driving means and said heads are rotatable in opposite directions about corresponding substantially vertical axes during crop working operation.

19. A hay making machine as claimed in claim 18, wherein said axes of rotation are inclined to the vertical whereby upper portions thereof are disposed further forwards with respect to the normal direction of travel of said machine than are the points of intersection thereof with the ground surface.

20. A hay making machine as claimed in claim 18, wherein the paths traced by the outermost ends or tips of at least one group of crop working elements of each rake member during crop working overlap one another when said machine viewed in plan.

21. A hay making machine as claimed in claim 18, wherein a coupling member on said frame is connectable to the three-point lifting device or hitch of an agricultural tractor.

22. A hay making machine as claimed in claim 7, wherein said first group of elements are connected to the hub-like portion by pivotable arm means and some of the crop working elements on said arm means are turnable about substantially vertical axes relative to said arm means, setting means on said arm means to retain said elements in chosen ones of different angular settings about said substantially vertical axes.

23. A hay making machine as claimed in claim 22, wherein each of said crop working elements are angularly adjustable about corresponding substantially vertical axes.

24. A hay making machine comprising a frame and at least one rake head rotatably mounted on said frame, said rake head comprising at least one pivotally mounted arm and vertically pivotable crop working tine means being connected to an outer end of said arm, the inner end of said arm being pivotally secured to a central hub-like portion of said head and said arm extending generally radially from the axis of rotation of said head during rotation thereof, driving means engaging said central hub-like portion to rotate said arm, a second crop working means being pivotally connected to said head and said second crop working means normally being located above said tine means, said first and said second crop working means being pivotable about corresponding non vertical pivotal axes that are substantially parallel to one another.

25. A hay making machine as claimed in claim 24, wherein said tine means and said crop working means comprise first and second groups of tines respectively.

26. A hay making machine as claimed in claim 25, wherein said first and second groups of tines are freely pivotable on their corresponding pivotal axes independent of one another.

27. A hay making machine as claimed in claim 25, wherein said second group of tines includes two straight and substantially parallel tines when viewed in a direction parallel to the axis of rotation of said head.

28. A hay making machine as claimed in claim 25, wherein a first of said pivotal axes connects a tine group of said arm and a second to said pivotal axes is located between said arm and said central hub-like portion.

29. A hay making machine as claimed in claim 28, wherein the tines of each group extend outwardly with respect to the axis of rotation of said head during operation and, when, viewed in a direction parallel to said axis of rotation, are positioned parallel to one another.

30. A hay making machine as claimed in claim 24, wherein said tine means comprises a group of at least two tines a first one of which is located, during working of the machine, forwardly of a second of said tines with respect to the normal direction of rotation of said head and at least partly at a higher horizontal level.

31. A hay making machine as claimed in claim 30, wherein each tine is cylindrical in cross-section and has a length at least about 50 times its diameter.

32. A hay making machine as claimed in claim 30, wherein each tine is curved in a plane that substantially contains the axis of rotation of said head.

33. A hay making machine as claimed in claim 30, wherein each tine has portions that are interconnected by an angular bend, said portions and said bend being contained in a plane that substantially contains the axis of rotation of said rake head.

34. A hay making machine as claimed in claim 24, wherein the second crop working means includes at least one elongate crop engager.

35. A hay making machine as claimed in claim 34, wherein said crop engager is tubular.

36. A hay making machine as claimed in claim 35, wherein said crop engager is non-rectilinear in configuration.

37. A hay making machine as claimed in claim 34, wherein there are a plurality of crop engagers and a plurality of arms and the former are located between said arms when said rake head is viewed in a direction parallel to its axis of rotation.

38. A hay making machine as claimed in claim 37, wherein each crop engager is freely pivotable about a corresponding axis.

39. A hay making machine as claimed in claim 38, wherein each of the pivotal axes of the engagers is perpendicular to the axis of rotation of the rake head.

40. A hay making machine as claimed in claim 25, wherein each tine group comprises two tines one of which is located, during working of the machine, behind the other with respect to the direction of rotation of the rake member at that time and at a higher horizontal level.

41. A hay making machine comprising a frame and at least one rake head rotatably mounted on said frame, said rake head comprising a first group of crop working elements and a second group of crop working elements, each of said groups having corresponding fastening portions that pivotably associate same with a central hub-like portion, each of said groups being pivotable in common about a substantially horizontal axis and vertically movable relative to said portion, driving means connected to said head to rotate same about a non horizontal axis, said first group of elements being fastened to the end of an arm and said second group of elements being fastened to a further arm that is retained against movement in a substantially radially outward direction relative to the first-mentioned arm during rotation of said head, said further arm being located above the first-mentioned arm.

42. A hay making machine as claimed in claim 41, wherein said further arm is pivotally connected to the first-mentioned arm for relative movements within defined limits.

43. A hay making machine comprising a frame and at least one rake head rotatably mounted on said frame, said rake head including a plurality of support arms pivotably connected to a central hub-like portion of said head and said arms being pivotable about non vertical axes, tine groups freely pivoted to said arms adjacent the outer ends thereof, spring means interconnecting said inner ends of said arms with the hub-like portion and biasing said arms with their tine groups upwardly about said non vertical axes during the non rotation of said head, driving means connected to said head to rotate same about an upwardly extending axis and said arms together with their tine groups being movable outwardly by centrifugal force against the bias of said spring means to an operative position during operation.

44. A hay making machine as claimed in claim 43, wherein said hub-like portion has a lower stop that restricts the downward movement of said arms during operation.

45. A hay making machine as claimed in claim 44, wherein said tine groups extend downwardly from the outer ends of their arms in a folded position during the non rotation of said head and a tine of each group is positioned to bear against said stop at rest.

46. A hay making machine as claimed in claim 43, wherein each said tine group includes at least two tines that extend downwardly at rest and substantially parallel to said upwardly extending axis of rotation of said head.

47. A hay making machine comprising a frame and at least one rake head rotatably mounted on said frame, said rake head comprising a central hub and a plurality of support arms independently pivoted to the lower portion of said hub, said arms extending generally radially from said hub during rotation thereof and a group of tines being pivoted to the outer end of each of said arms, a plurality of elongated crop engaging elements being pivotally associated with said hub and said elements extending radially from said hub to an adjacent position above the groups of tines during the rotation of said head, said groups of tines and said elements being pivotable about generally horizontal axes into upwardly extending positions, whereby the width of said head is reduced for the transport of said machine, driving means connected to said head to rotate same.

* * * * *